United States Patent Office 3,018,220
Patented Jan. 23, 1962

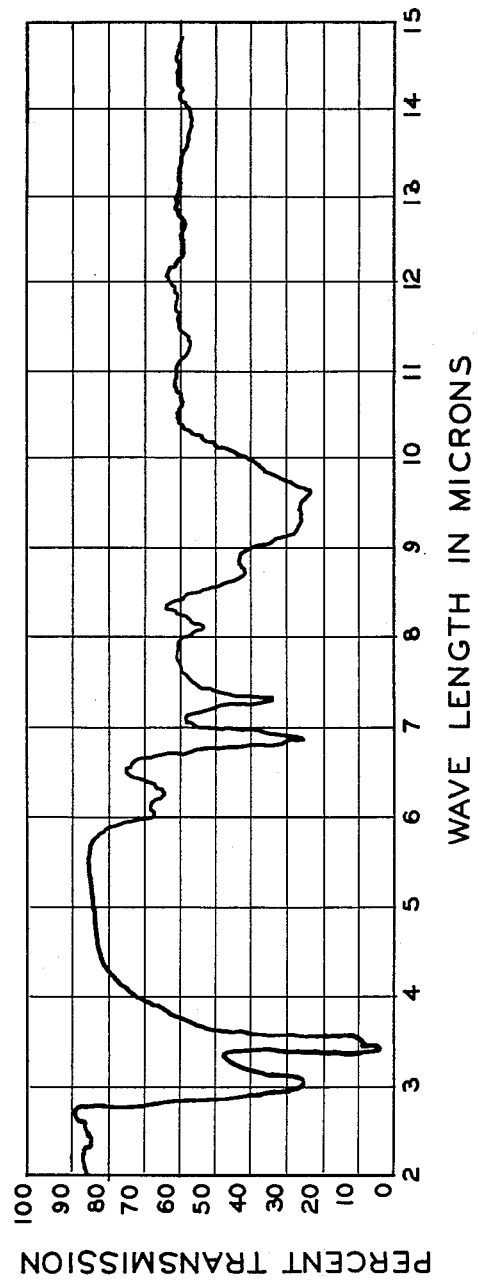

3,018,220
HYGROMYCIN B, ITS PRODUCTION AND TREATMENT OF INTESTINAL PARASITES
James M. McGuire and Robert L. Mann, Indianapolis, Ind., assignors to Eli Lilly and Company, Indianapolis, Ind., a corporation of Indiana
Filed Oct. 15, 1957, Ser. No. 690,399
7 Claims. (Cl. 167—53)

This application is a continuation-in-part of our copending application Serial No. 629,189, filed December 18, 1956.

This invention relates to a novel antibiotic agent and to its preparation.

The novel antibiotic agent is denominated herein by the arbitrary name hygromycin B.

Hygromycin B is a colorless solid which is quite soluble in water and a relatively soluble in solvents such as methanol, dimethylformamide, glacial acetic acid, and the like. It is relatively insoluble in solvents such as ether, chloroform, ethylene chloride, hexane, benzene, and the like. It melts with decomposition over an indefinite range of about 160–180° C., the melting range being in part dependent upon the rate at which the material is heated.

Hygromycin B is weakly basic. It has pK'α values of about 7.20 and 8.95 as determined in 66 percent dimethylformamide solution, and 7.1 and 8.8 as determined in water. The basicity appears to arise from the presence in the molecule of two amino groups.

In water solution, in one percent concentration, at a temperature of 20° C. the specific rotation of sodium D light by hygromycin B is +19.2°.

The chemical structure of hygromycin B has not been completely elucidated. Degradative studies have revealed that the hygromycin B molecule does not contain an aromatic type nucleus, but that there is present in the molecule a diaminoinositol and a neutral sugar. Hydrolysis of hygromycin B at refluxing temperature with 6 N hydrochloric acid for a period of about 16 hours yields a diaminoinositol in which one of the amino groups is a methylamino group. Hydrolysis of hygromycin B at refluxing temperature with 0.5 N sulfuric acid for a period of about 3 hours yields a neutral sugar having the formula $C_6H_{12}O_6$. The sugar resembles, and may be identical with talose.

Hygromycin B forms salts with the common acids. For example, the hydrochloride, sulfate, phosphate, maleate and like salts are readily prepared. Such salts are in general quite water soluble. Hygromycin B also forms salts or salt-like complexes with high molecular weight acids, for example, p-(p'-hydroxyphenylazo) benzene sulfonic acid, methyl orange and the like. These salts or complexes are usually relatively insoluble in water.

The antibiotic appears to be stable in aqueous solution over a pH range between about pH 1 and pH 10.

An average of several elemental analyses has shown hygromycin B to have the following composition: 45.43 percent carbon, 7.26 percent hydrogen, 7.10 percent nitrogen, and 40.21 percent oxygen, the last value being obtained by difference. The foregoing values indicate that hygromycin B has an empirical formula which is $C_{15}H_{28}O_{10}N_2$. The molecular weight of hygromycin B base calculated from the experimentally obtained titration data in water was determined to be about 400.

The ultraviolet absorption spectrum of an aqueous solution of hygromycin B shows no absorption maxima.

The infrared absorption spectrum of a sample of hygromycin B mulled in mineral oil contains the following distinguishable, somewhat broad absorption maxima: 3.03, 6.01, 6.12, 6.24, 6.34, 8.10, 8.72, 9.30, 9.63 and 11.25 microns. The infrared absorption curve of the above mull is shown in the accompanying drawing.

Hygromycin B base displays antibiotic activity against certain Gram-positive and Gram-negative microorganisms, including *Staphylococcus aureus*, *Mycobacterium tuberculosis* (H 37 RV), *Staphylococcus aureus* (Streptomycin-resistant), *Bacillus subtilis*, *Mycobacterium phlei*, *Mycobacterium tuberculosis* (607), *Mycobacterium avium*, *Salmonella gallinarium*, *Escherichia coli*, *Aerobacter aerogenes* and *Klebsiella pneumoniae*.

When administered orally in suitable dosage forms such as in capsules or tablets, or more conveniently, as a component of the diet, hygromycin B is effective in freeing an infected host from animal parasites such as amoebae, ascaris, whipworms, pinworms, lungworms, strongyles, and strongyloids.

Hygromycin B can be produced by culturing a hygromycin B producing strain of actinomycete organism under aerobic conditions in a culture medium containing assimilable sources of carbohydrate, nitrogen, and inorganic salts until substantial antibiotic activity is imparted to the culture medium. The hygromycin B can be recovered by subjecting the medium to various isolation and purification procedures. Although the hygromycin B preferably is at least in relatively pure form for incorporation into pharmaceutical type medicinals such as tablets or capsules, such purification is of course not necessary if the hygromycin B is to be incorporated in a feedstuff and employed as a dietary component. In such case the culture medium containing the antibiotic can, if desired, merely be dried as by spray drying, and the hygromycin B-containing mixture incorporated in suitable amount in the feedstuff. Alternatively, the hygromycin B can be partially purified to free it from the bulk of the inert material in the culture medium, and the partially purified hygromycin B employed as an antiparasitic agent, for example, by blending it with a feedstuff.

Because of the uncertainty of taxonomic studies of the Actinomyces group of organisms there is always an element of doubt associated with the classification of any newly discovered organism. However, the organisms we have found to be capable of producing hygromycin B appear to resemble most closely the actinomycete, *Streptomyces hygroscopicus*, an organism first described by Jensen in Proc. Linn. Soc. New South Wales, 56:345–370 (1931). The three strains of the organisms which we have employed in the production of hygromycin B have been placed on permanent deposit with the Culture Collection of the Northern Regional Research Laboratories at Peoria, Illinois, and have been assigned the culture numbers NRRL 2387, NRRL 2388, and NRRL 2389. The three strains were isolated respectively from soil samples collected in Marion County, Indiana; Saunders County, Nebraska; and Vigo County, Indiana. The method of isolation consisted in plating a greatly diluted earth sample on nutrient agar, incubating the plate until organism growth was secured, and then picking off discrete colonies of the organism with a sterile platinum loop.

The above three strains which are distinctive in appearance on casual observation are characterized by their ability to produce hygromycin B under suitable culture conditions. Certain distinguishing characteristics make it appear that they all belong to the species *S. hygroscopicus*. In the following paragraphs are set forth detailed taxonomic studies of the above-mentioned hygromycin B-producing strains of the actinomycete.

In the studies, the methods employed are those commonly used in the taxonomy of actinomycetes. The carbon and nitrogen utilization tests were carried out by the methods of Pridham and Gottlieb, J. Bact., 56:107–114 (1948). Publications by Waksman, Soil Sci., 8:71–215 (1919), and Jensen, Soil Sci., 30:59–77 (1930), and Conn., N.Y. Agr. Exp. Sta. Tech. Bull. 60, 1–25 (1917), provide the basis for the remaining tests and characterizations. The system of Ridgway, Color Standards and Color Nomenclature (1912), is employed for the name of most of the colors, and when that system is used the initial letter of the color is capitalized.

TABLE I

*Microscopic morphology*

| NRRL 2387 | NRRL 2388 | NRRL 2389 |
|---|---|---|
| SYNTHETIC AGAR | | |
| This culture forms a typical much branched, prostrate vegetative mycelium giving rise to erect, branching aerial mycelium. Aerial spores are born on short branched conidiophores in narrow, tight spirals. As the culture matures, dense clusters of spores entangled with aerial hyphae cover surface of growth. Microscopically, individual spores have a typical geometric shape, whether free or in spiral chains. They are roughly square to rectangular in outline, but the cell surface which is or has been oriented to the outside of the spiral chain is longer than the surface toward the inside of the spiral, thus giving the appearance of a keystone. This characteristic form persists in free spores. After about 2 weeks, incubation, spherical, refractive bodies appear abundantly in the aerial mycelium, either terminally or along the body of individual hyphae. These bodies vary considerably in size, but are generally several times the diameter of a single hypha. These structures appear not to be cellular but rather are globules of a liquid exudate. | Same as NRRL 2387. | Same as NRRL 2387. |
| OTHER MEDIA | | |
| Characteristic spirals also formed on glucose-asparagine, Emerson's starch, and calcium malate agar media. Globular bodies found on glucose asparagin and calcium malate, not observed on starch and Emerson's agar in cultures incubated 32 days. | Like NRRL 2387 but no globules observed in 32-day old cultures on glucose-asparagine, calcium malate or Emerson's agar. Starch agar not tested. | Spirals formed as in case of NRRL 2387. Globular bodies found on glucose-asparagin and starch agar, not observed on calcium malate or Emerson's agar. |

TABLE II

*Cultural characteristics*

| NRRL 2387 | NRRL 2388 | NRRL 2389 |
|---|---|---|
| SYNTHETIC AGAR | | |
| Moderate amount of colorless vegetative mycelium burrowing into medium, with moderate amount of mottled gray and white aerial mycelium ranging from Pale Mouse Gray at base to Mouse Gray at top of slant; few black areas at margin or streak. Sporogenous layer of growth flat, powdery; spores very abundant by microscopic observation. Microscopic pitting of surface of spore crust near margin of growth, especially in dark-pigmented areas; appearance of cavities coincides with disappearance of droplets of exudate of similar size excreted earlier during growth. No soluble pigment. | Same as NRRL 2387 except that pigmentation of aerial mycelium is evenly gray, not mottled, and becomes nearly coal black in 2 to 4 weeks. Also growth is somewhat more spreading, pitting of surface more widespread. | Like NRRL 2387 except aerial mycelium first Pale to Deep Quaker Drab, becoming nearly coal black. Trace of greenish soluble pigment. |
| GLUCOSE-ASPARAGINE AGAR | | |
| Vegetative mycelium burrowing, colorless, present in good amount. Aerial mycelium rather thin; white underneath with overgrowth of Mouse Gray color becoming Dark Quaker Drab to almost black. Aerial mycelium thin, first dotted with droplets of exudate where pitting later appears; surface becomes dull and moist. Trace of brownish soluble pigment. | Like NRRL 2387 but aerial mycelium heavier, uniformly gray becoming coal black and moist in 2 to 4 weeks. | Like NRRL 2387 but reverse of growth Chamois color due to trace of soluble pigment. Aerial mycelium, thin, white in center of streak, thicker and dark along margins. Ranges from white (at center) to Mouse Gray (at top) becoming Sooty Black and moist in 2 to 4 weeks. |
| CALCIUM MALATE AGAR | | |
| Moderate amount of vegetative growth, reverse Pinkish Buff. Moderate amount of white aerial mycelium which at maturity develops mottled appearance with beads of Dark Mouse gray and some Sooty Black growth. Surface uneven, colonial, sporulation poor to moderate, especially at first. Medium cleared of insoluble salts. Pinkish Buff soluble pigment. | Like NRRL 2387 but aerial mycelium develops late, becoming Pale Quaker Drab, finally moist, black. Raised, non-sporulated colonial type growth at base of slant. | Like NRRL 2387 but soluble pigment Light Pinkish Cinnamon, aerial mycelium flat, white; overgrowth of Light Quaker Drab appears late, becomes black, moist after 2 to 4 weeks' incubation. Button-like nonsporulated colonial growth at base of slant as shown by NRRL 2387. |

TABLE II—Continued

| NRRL 2387 | NRRL 2388 | NRRL 2389 |
|---|---|---|
| EMERSON'S AGAR | | |
| Good growth of vegetative mycelium, reverse Isabella Color. Aerial mycelium abundant, white, becoming Mouse Gray and Dark Quaker Drab with tufts of tiny, white colonial overgrowth. Soluble pigment light brown. | Like NRRL 2387 but aerial mycelium Light Quaker Drab becoming black and moist in 2 to 4 weeks except at butt of slant where growth is transparent. Growth deeply wrinkled, grooved. | Like NRRL 2387 but reverse of vegetative growth Orange Rufous darkening to Burnt Sienna. Young aerial mycelium white becoming Deep Quaker Drab, finally dull black. Growth wrinkled, grooved. Soluble pigment Mahogany Red becoming Burnt Sienna at 28 days. |
| NUTRIENT AGAR | | |
| Moderate amount of colorless vegetative growth and of white aerial mycelium. Slight general darkening of medium, but pigment too faint to characterize as to color. | Like NRRL 2387. | Like NRRL 2387. |
| GLUCOSE NUTRIENT AGAR | | |
| Growth similar to that on Emerson's agar but slightly less abundant. Aerial mycelium powdery, white and Mouse Gray becoming uniformly Mouse Gray except for white marginal areas and some white colonial overgrowth. Light brown soluble pigment. | Growth as on Emerson's but even more abundant aerial mycelium. Entire surface of growth eventually black; very little white overgrowth. Soluble pigment faint brown or absent. | Growth as on Emerson's but aerial mycelium wrinkled, thin, white (nearly transparent) with some Quaker Drab coloration appearing near butt of slant. Soluble pigment near Burnt Sienna at 28 days. |
| STARCH AGAR | | |
| Moderate amount of vegetative growth with good growth of aerial mycelium; latter mottled white and shades of Mouse Gray at first, darkening with continued incubation, gray areas gradually turning black. Small droplets of exudate produced early. Surface of growth microscopically pitted at maturity. Trace of greenish soluble pigment. Starch hydrolyzed (zone of hydrolysis 21 mm. wide). | Like NRRL 2387 but not mottled; pigmentation of aerial mycelium uniform at all stages, but passes through same series of color changes (white to Mouse Gray to black). Growth eventually completely black. Starch hydrolyzed (zone of hydrolysis 28 mm. wide). | Resembles NRRL 2387 in character of growth and pigmentation, but small amount of orange-pink soluble pigment at top of slant growth. Growth more vigorous and uniform than that of NRRL 2387, eventually completely black. Starch hydrolyzed (zone of hydrolysis >20 mm. wide). |
| POTATO PLUG | | |
| Growth variable in replicate tubes. Good vegetative growth; raised, rugose and cracked. Abundant growth of aerial mycelium, mottled white and gray, the gray pigment near Pale Quaker Drab in color. Aerial mycelium raised, powdery, pitted to some extent. Plug darkened. | Like NRRL 2387 but growth and sporulation less vigorous; aerial mycelium colorless or white where present. | Like NRRL 2387 but aerial mycelium Mouse Gray, reverse of growth black where adheres to glass. Soluble pigment in water below plug. Cinnamon becoming Vinaceous Rufous in color. |
| GELATIN (25° C.) | | |
| Growth poor, amorphous, colorless. Liquefaction much delayed, beginning in about 20 days but nearly complete in 28 days. No soluble pigment. | Like NRRL 2387 but liquefaction slightly less complete in 28 days. | Like NRRL 2387 but liquefaction complete in 28 days. |
| LITMUS MILK (30° C.) | | |
| Ring of growth with thin crust of white aerial mycelium. Hydrolysis without coagulation, nearly complete in 6 days, complete in 9 days, alkaline (final pH 7.5). | Like NRRL 2387 but growth ring heavier. Final pH 7.6. | Like NRRL 2387; final pH 7.6. |
| LITMUS MILK (37° C.) | | |
| Ring of bluish-purple growth with white aerial mycelium. Rapid hydrolysis, in some cases preceded by soft curd. Reaction alkaline. | Like NRRL 2387 but growth ring near Mahogany Red in color. | Like NRRL 2387. |
| NUTRIENT BROTH | | |
| Growth poor, submerged, fluffy, adhering. No soluble pigment. | Like NRRL 2387 but growth even less vogorous. | Like NRRL 2387. |
| GLUCOSE-NUTRIENT BROTH | | |
| Fair growth, mostly submerged, soft, adhering; very few floating colonies. No soluble pigment. | Like NRRL 2387 but growth somewhat poorer. | Like NRRL 2387. |
| TYROSINE BROTH | | |
| Few white floating colonies with some fluffy amorphous submerged growth. No soluble pigment. | Like NRRL 2387. | Like NRRL 2387. |
| CELLULOSE STRIPS | | |
| Cellulose utilized but growth not abundant. | Like NRRL 2387 but growth good. | Like NRRL 2387 but growth good. |

In Tables III, IV, and V are set forth the results of utilization tests carried out on the organism strains. In the tables the following symbols are employed for sake of brevity:

+ = growth and utilization.
− = no growth, no utilization.
± = limited growth, probably poor utilization.
S = exceptionally good sporulation.
sl = slight.
BSP = brown soluble pigment.
OSP = orange soluble pigment.
BOP = brownish-orange pigment.
G = good growth.

TABLE III
*Utilization of carbon sources for growth*

| Substrate | NRRL 2387 | NRRL 2388 | NRRL 2389 |
|---|---|---|---|
| L (+) arabinose | + | + (S) | + |
| D (+) xylose | + | + | + |
| D (+) rhamnose | + | + | + |
| D (−) fructose | + (S, sl BSP) | + (S, sl BSP) | + (S, BOP) |
| D (+) galactose | + | + | + |
| D (+) glucose | + (S, sl BSP) | + (S) | + (S) |
| D (+) mannose | + (S, sl BSP) | + (S, sl BSP) | + (S, sl BSP) |
| cellobiose | + (S, sl BSP) | + (S, sl BSP) | + (S, OSP) |
| D (+) lactose | + | + | + |
| D (+) maltose | + (S) | + (S) | + (S) |
| sucrose | − | − | − |
| D (+) raffinose | ± | + | ± |
| inulin | − | − | − |
| mannitol | + (S) | + (S) | + (S) |
| dulcitol | − | − | − |
| D (−) sorbitol | − | − | − |
| inositol | ± | + | + |
| salicin | + (BOP) | + (BOP) | + (BOP) |
| dextrin | + (S, sl BSP) | + (S, sl BSP) | + (S, BSP) |
| starch | + (S, sl BSP) | + (S, sl BSP) | + (S, BSP) |
| Sodium acetate | + | + | + |
| sodium citrate | ± | + | + |
| sodium formate | − | − | − |
| sodium malate | + | + | + |
| sodium salicylate | − | − | − |
| sodium succinate | + | + | + |
| sodium tartrate | − | + | ± |
| asparagine | + | + | + |

TABLE IV
*Utilization of nitrogen sources for growth*

| Substrate | NRRL 2387 | NRRL 2388 | NRRL 2389 |
|---|---|---|---|
| ammonium sulfate | + (S, sl BSP) | + (S, sl BSP) | + (S, BOP) |
| asparagine | + (S, sl BSP) | + (S, sl BSP) | + (S, sl BSP) |
| sodium nitrate | + (sl BSP) | + | + |

TABLE V
*Reduction of nitrates to nitrites*

| Carbon Source | NRRL 2387 | | NRRL 2388 | | NRRL 2389 | |
|---|---|---|---|---|---|---|
| | Growth | Nitrite Test | Growth | Nitrite Test | Growth | Nitrite Test |
| glycerol | G | + | G | + | G | + |
| glucose | G | − | G | Trace | G | + |
| sucrose | G | + | G | + | G | + |
| starch | G | − | G | − | G | − |

As noted above, strains NRRL 2387, NRRL 2388, and NRRL 2389 can be grown in the culture medium to produce an effective antibiotic agent. The culture medium can be any one of a number of media since, as is apparent from the above-described utilization tests, the organisms are capable of utilizing many energy sources. However, for economy of production, maximum yield and ease of isolation of the antibiotics, certain culture media are preferable. Thus for example, the presently preferred source of carbohydrate in the culture medium is glucose. Other sources which may be included are starch, sucrose, dextrins, molasses, and the like. The preferred nitrogen sources are corn steep, soybean meal or flour, and distillers' solubles, but other sources which are utilizable include casein, amino acid mixtures, peptones (both meat and soy), and the like. Inorganic nitrogen sources such as nitrate salts or ammonium salts can also be employed.

The nutrient inorganic salts to be incorporated in the medium include the customary salts capable of yielding ions of sodium, potassium, calcium, phosphate, chloride, sulfate and the like.

As is necessary for the growth and development of other microorganisms, essential trace elements should also be included in the culture medium for growing the actinomycete employed in this invention. Such trace elements are commonly supplied as impurities incidental to the addition of the other constituents of the midium.

The organism strains we have employed to produce hygromycin B are readily cultured, and are far less critical as to growth conditions than are many other actinomycetes. Thus, for example, the organism grows in numerous media of widely varied pH. However, prior to inoculation with the organism it is preferable to adjust the pH of the culture medium to between pH 6.0 and pH 7.5, and preferably to about pH 6.5. As has been observed with other actinomycetes, throughout the growth period of the organism during which time the antibiotic is produced, the medium gradually becomes alkaline and may attain an alkalinity from about pH 7.2 to about pH 8.0 or above, the final pH being dependent at least in part on the initial pH of the medium, the buffers present in the medium, and the period of time for which the organism is permitted to grow.

As is also preferred for the production of other antibiotics, submerged, aerobic culture in large tanks are the conditions of choice for the production of substantial amounts of hygromycin B. Small amounts of the antibiotic conveniently are obtained by shake flask and surface culture in bottles. As is well known, when production is carried out in large tanks it is preferable to use the vegetative form of the organisms for inoculation of the production tanks to avoid a pronounced lag in the production of the antibiotic and the attendant inefficient utilization of the equipment. Accordingly, it is desirable first to produce a vegetative inoculum of the organisms by inoculating a relatively small quantity of culture medium with the spore form of the organisms, and to transfer aseptically the young, active, vegetative inoculum so obtained to the large tanks. The medium in which the vegetative inoculum is produced can be the same or different medium as that utilized for the production of the antibiotics.

The organisms can be grown well at temperatures between about 25° C. and about 32° C. Optimal antibiotic production appears to occur with the culture medium maintained at about 26–30° C.

As is customary in producing antibiotics by submerged culture processes, sterile air is blown through the culture medium. For efficient growth of the organism and antibiotic production the volume of air employed in the tank production of hygromycin B preferably is upwards of 0.1 volume of air per minute per volume of culture medium. More efficient growth and antibiotic production are secured when the volume of air used is at least one volume of air per minute per volume of culture broth.

The rate of production of hygromycin B and the concentration of the antibiotic activity in the culture medium can readily be followed during the growth period of the microorganism by testing samples of the culture medium for their antibiotic activity against organisms known to be susceptible to the antibiotic, for example *Bacillus subtilis*. The bioassay can be carried out by the standard turbidmetric or cup-plate methods, or by paper disc assay upon agar plates.

In general, maximum production of antibiotics after inoculation of the culture medium occurs within about two to five days when submerged aerobic culture or shake flask culture is employed, and within about five to ten days when surface culture is used.

Hygromycin B can be recovered from the culture medium and separated from other substances which may be present by extractive and adsorptive techniques. Adsorpion processes for recovery of hygromycin B are preferred at present because such procedures eliminate the relatively large volumes of solvents required when extractive techniques are employed. Carbon is a suitable adsorbant for separating the antibiotic from the filtered culture broth. The antibiotic substance fixed on the adsorbing agent is recovered by customary elution procedures, using an aqueous organic solvent.

For recovery of hygromycin B, ion exchange resins of acidic nature preferably are employed, for example, a cation exchanger consisting of a copolymer of methyl acrylate and a divinyl benzene having functional carboxyl groups, such as that available commercially under the trademark "IRC–50." Separation of hygromycin B from other antibiotics is readily accomplished with ion exchange resins by taking advantage of the basic nature of hygromycin B. Thus, solution containing one or more antibiotics in addition to hygromycin B can be subjected to sequential treatment with basic and acidic ion exchangers, thereby achieving a separation of acidic antibiotics from the basic hygromycin B. Such a procedure is quite suitable for separating hygromycin from the acidic antibiotic, hygromycin, which also is produced by culturing the above-specified streptomyces strains.

It will be apparent to those skilled in the art that various combinations of the above processes and modifications thereof can be utilized in the isolation and purification of the novel antibiotic of this invention.

This invention is further illustrated by the following specific examples:

EXAMPLE 1

A sporulated culture of *Streptomyces hygroscopicus* strain NRRL 2387 is produced by growing the organism on a nutrient agar slant of the following composition:

| | g. |
|---|---|
| Starch | 20 |
| Asparagine | 1 |
| Beef extract | 3 |
| Agar | 20 |
| Water, q.s. to make 1 l. | |

The slant is inoculated with spores, and is incubated for about five days at about 26° C. The sporulated culture is covered with a small amount of water and the slant is scraped gently to loosen the spores and obtain an aqueous spore-suspension.

A spore suspension of strain NRRL 2387 thus obtained is used to inoculate 1500 ml. of a sterile vegetative growth medium having the following composition:

| | g. |
|---|---|
| Glucose | 15 |
| Soybean meal | 15 |
| Corn steep solids | 5 |
| Sodium chloride | 5 |
| Calcium carbonate | 2.5 |
| Water, q.s. 1 l. | |

The inoculated medium contained in a 6-liter flask is grown with constant shaking for forty-five hours at a temperature of 28° C. to produce the vegetative from of the organism. The vegetative inoculum is then employed to inoculate a sterile production culture medium having the following composition (percentages expressed on a weight-volume basis):

| | Percent |
|---|---|
| Glucose | 3.0 |
| Soybean meal | 2.5 |
| Corn steep solids | 0.5 |
| Calcium carbonate | 0.2 |
| Sodium chloride | 0.5 |
| Water, q.s. 175 gallons. | |

The inoculated culture medium contained in a 250-gallon fermenter is maintained at a temperature of about 28° C. and during the fermentation period is stirred, and aerated with sterile air in the amount of about one volume of air per volume of culture medium per minute. The fermentation is allowed to proceed for about 100 hours during which time the pH of the culture medium gradually changes from about pH 6.2 to about pH 7.0. At the end of the fermentation period the amount of antibiotic activity in the medium can be determined in the usual manner. A fermentation broth thus obtained contains about 200 g. of hygromycin B (as determined by paper disc assay procedures using *B. subtilis* as the test organism). The filtered broth is passed over a column 4" x 34" in dimensions and containing a cation exchange resin (previously washed with sodium hydroxide to place it in the sodium cycle) comprising a copolymer of methyl acrylate and a divinyl benzene having functional carboxyl groups, at the rate of about 100 ml. per minute. An example of a suitable cation exchanger of this type is that sold commercially by the Rohm & Haas Co. under the designation of "IRC-50." After all of the broth has been put through the column, the column is washed with deionized water until the effluent is substantially colorless. The effluent which contains an amount of the antibiotic, hygromycin, is discarded, but, if desired, can be used as a source material for that antibiotic.

The column on which the hygromycin B is adsorbed is eluted with about 55 l. of 0.1 N hydrochloric acid. Near the end of the elution, the effluent is colorless and the pH is about 1.5. The acid eluate is adjusted to pH 6.9 using 10 percent aqueous ammonium hydroxide, and is concentrated to small volume. The concentrated eluate is frozen and dried from the frozen state. The residue is dissolved in 29 l. of deionized water and the solution is filtered. The slight amount of insoluble material is discarded. The filtrate is adjusted to pH 10.5, about 2.9 kg. of activated carbon (Norite SG) are added, and the mixture is stirred for about one hour at room temperature. The carbon is removed by filtration, and the filter cake is washed thoroughly by slurrying it in about 14.5 l. of deionized water. The slurry is filtered, and the washing by slurrying is repeated. The filter cake comprising activated carbon on which the hygromycin B is adsorbed, is slurried for about one hour at room temperature with about 14.5 l. of a mixture containing 1.45 l. of concentrated ammonium hydroxide, 4.35 l. of water and 8.7 l. of acetone. The mixture is filtered and the filter cake is again slurried with the same amount of the mixture of ammonium hydroxide, acetone and water and the slurry filtered. The filtrates which contain the hygromycin B are combined, and are concentrated by evaporation in vacuo to a volume of about 550 ml. To the concentrated residue are added with stirring 3.5 l. of acetone. A gum comprising hygromycin B precipitates and adheres to the walls and bottom of the vessel. The supernatant liquid is decanted from the gum, and the gum is dissolved in a minmium quantity of absolute methanol. The methanol solution is then poured slowly with stirring into 9 l. of ether, whereupon a precepitate of hygromycin B forms. The supernatant methanol-ether is decanted from the precipitate and the precipitate is then washed three times with ether, decanting the ether from the precipitate after each washing. The precipitate is dried and freed from adherent ether by subjecting it to a vacuum. About 144 g. of hygromycin B are obtained.

Acid addition salts of hygromycin B can be prepared by reacting equivalent amounts of hygromycin B and the selected acid, in a suitable inert solvent solution. The precipitation of the salt followed by filtration and drying yields the selected salt in solid form.

A solution of about 250 mg. of hygromycin B in about 3 ml. of methanol is treated with 0.3 ml. of concentrated sulfuric acid. The white amorphous precipitate which is immediately formed, is removed by filtration and is washed with a small amount of ether. The solid material is the sulfuric acid addition salt of hygromycin B.

Hygromycin B sulfate is an amorphous white substance. When dissolved either in acid or alkaline aqueous solution, and subjected to examination for absorption of light in the ultra-violet region of the spectrum, only general low intensity absorption is noted. Electrometric titration of hygromycin B sulfate in 66 percent aqueous dimethylformamide solution indicates the presence of pK'α values at 7.2 and 8.9, the initial pH value being pH 2.4. The molecular weight as calculated from the titration studies is approximately 500.

For the preparation of hygromycin B dihydrochloride, 0.5 g. of hygromycin B are dissolved in 20 ml. of methanol and 0.3 ml. of concentrated hydrochloric acid are added to the solution. The mixture is warmed until it is homogeneous, and ether is added until precipitation begins. The mixture is cooled, whereupon hygromycin B dihydrochloride separates as a white amorphous precipitate. The precipitate is removed by filtration, is washed with ether and is dried. Additional purification can be effected by redissolving the salt in a minimum amount of warm methanol and precipitating the salt with ether. Hygromycin B dihydrochloride is a white amorphous substance which is soluble in water. It melts with decomposition at about 170–175° C.

To a solution containing 4 g. of hygromycin B in 50 ml. of water is added dropwise a saturated aqueous solution of p-(p-hydroxyphenylazo)benzenesulfonic acid, until precipitation is completed. The resulting crystalline precipitate is removed by filtration. After recrystallization from alcohol-water solution, the salt melts with decomposition at about 220–230° C. The p-(p'-hydroxyphenylazo)benzenesulfonate salt of hygromycin B thus prepared contains 2 mols of p-(p'-hydroxyphenylazo)benzenesulfonic acid for each mol of hygromycin B.

When aqueous solutions of hygromycin B are treated with solutions of phosphotungstic acid, methyl orange, or Reinecke's salt, precipitates are formed which can be employed for recovery of hygromycin B from solution. The antibiotic can be recovered from such precipitates by treating them with an excess amount of aqueous alkali, to cleave the complex salt or adduct, and then subjecting them to extraction and recovery procedures similar to those set forth hereinabove.

EXAMPLE 2

Ten gallons of a fermentation broth obtained according to the procedure of Example 1 are adjusted to pH 4.0, and are centrifuged to remove the mycelium. The supernatant liquid is then adjusted to pH 8.0 and the liquid is poured over a column 4" x 18" in dimensions and containing activated carbon (Norite SG). The antibiotic substances present in the fermentation broth are thereby adsorbed upon the carbon. After all the fermentation broth has passed through the column a mixture of equal parts of acetone and 0.02 N hydrochloric acid is used to remove the antibiotics from the column. When substantially all of the antibiotic activity has been removed, as shown by microbiological assay of the eluate, the eluate is evaporated to dryness in vauco, whereupon a residue is obtained comprising hygromycin B together with amounts of such other antibiotic substances as the Sterptomyces organism may have produced. The mixture is suitable for incorporation in an animal feed for its antiparasitic properties.

If desired, the whole hygromycin B-containing culture broth, with or without filtration to remove the mycelium, can be dried as by drum or spray drying, and the dried material can be incorporated in appropriate amount in a suitable feedstuff to provide a medicated feed for clearing swine of parasites such as *Ascaris lubricoides*.

We claim:

1. A method of producing hygromycin B which comprises cultivating a hygromycin B-producing strain of *Streptomyces hygroscopicus* in a culture medium containing mold-assimilable sources of carbohydrate, nitrogen and inorganic salts, under submerged aerobic conditions until a substantial amount of hygromycin B is produced by said organism in said culture medium, and recovering and isolating substantially free from other antibiotic substances the hygromycin B from said culture medium.

2. A method according to claim 1 in which the organism is *Streptomyces hygroscopicus* NRRL 2387.

3. A method according to claim 1 in which the organism is *Streptomyces hygroscopicus* NRRL 2388.

4. A method according to claim 1 in which the organism is *Streptomyces hygroscopicus* NRRL 2389.

5. A member of the group consisting of hygromycin B and its acid addition salts, said hygromycin B being characterized as a white, solid substance quite soluble in water, relatively soluble in methanol, dimethylformamide and glacial acetic acid and relatively insoluble in ether, chloroform, ethylene chloride hexane and benzene, melting with decomposition over a range of about 160 to 180° C., being weakly basic, having pK'a values of 7.1 and 8.8 in water, having an optical rotation of $[\alpha]_D^{20°} = +19.2$ (1 percent in water), being free from an aromatic type nucleus, yielding upon strong acid hydrolysis a diaminoinositol, and upon weak acid hydrolysis a neutral sugar having the formula $C_6H_{12}O_6$, having a molecular weight of about 400, having shown upon analysis the presence of 45.43 percent carbon, 7.26 percent hydrogen, 7.10 percent nitrogen, and 40.21 percent oxygen, the said analytical values establishing the empirical formula $C_{15}H_{28}O_{10}N_2$, having spectral absorption maxima as a mineral oil mull in the infrared region over the range of about 2 to about 15 microns at about the following wave lengths expressed in microns: 3.03, 6.01, 6.12, 6.24, 6.34, 8.10, 7.72, 9.30, 9.63, and 11.25, and having in aqueous solution only a general absorption without absorption maxima in the ultraviolet spectrum.

6. A novel composition adapted for freeing an infected host from animal parasites, said composition comprising a feedstuff for said host, said feedstuff having incorporated therein as a component, a parasiticidally effective amount of a member of the group consisting of hygromycin B and acid addition salts of hygromycin B, the said hygromycin B being a compound as characterized in claim 5.

7. Hygromycin B base as described in claim 5.

References Cited in the file of this patent

UNITED STATES PATENTS

| | | |
|---|---|---|
| 2,649,401 | Haines et al. | Aug. 18, 1953 |
| 2,746,902 | Gottlieb | May 22, 1956 |
| 2,938,836 | Hagemann et al. | May 31, 1960 |
| 2,953,495 | Brockmann et al. | Sept. 20, 1960 |

FOREIGN PATENTS

| | | |
|---|---|---|
| 713,975 | Great Britain | Aug. 18, 1954 |
| 514,590 | Canada | July 12, 1955 |

OTHER REFERENCES

Waksman: "The Actionomycetes," pub. 1950 by the Chronica Botanica Co., Waltham, Mass., pages 116–118.

"Antibiotics and Chemotherapy," pp. 1243–1246 and 1268–1278 (received for publ. June 8, 1953), December 1953.

Waksman et al.: "Actinomycetes and Their Antibiotics," pub. 1953 by Williams and Wilkins, Baltimore, Md., pp. 93–94, 168–184 (173 and 180–181 are especially pertinent).

Tatsuoka: J. of Antibiotics, January 1955, page 31, Ser. A.

Sakai: J. Antibiotics, vol. 7, No. 4, pp. 116–119, 1954.

Tresner: Applied Microbiology, pp. 243–250, 1956.

UNITED STATES PATENT OFFICE
CERTIFICATION OF CORRECTION

Patent No. 3,018,220                                                         January 23, 1962

James M. McGuire et al.

It is hereby certified that error appears in the above numbered patent requiring correction and that the said Letters Patent should read as corrected below.

Column 1, line 17, for "a" read -- is --; columns 5 and 6, "TABLE II" second column thereof, under the heading "NUTRIENT BROTH" for "vogorous" read -- vigorous --; column 10, line 3, after "hygromycin" insert -- B --; line 41, for "forty-five" read -- forty-eight --; column 11, line 72, for "beings" read -- begins --; column 12, line 9, for "p-(p-hydroxyphenylazo)-benzenesulfonic" read -- p-(p'-hydroxyphenylazo)benzenesulfonic --; line 52, for "lubricoides", in italics, read -- lumbricoides --, in italics; column 14, line 10, for "713,975" read -- 713,795 --.

Signed and sealed this 12th day of June 1962.

(SEAL)
Attest:

ERNEST W. SWIDER                                                DAVID L. LADD
Attesting Officer                                                    Commissioner of Patents